US012789603B2

(12) United States Patent
Favaretto

(10) Patent No.: US 12,789,603 B2
(45) Date of Patent: Nov. 10, 2026

(54) OPENABLE ROOF FOR SPORTS CARS

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 360 days.

(21) Appl. No.: 18/408,091

(22) Filed: Jan. 9, 2024

(65) Prior Publication Data

US 2024/0239164 A1 Jul. 18, 2024

(30) Foreign Application Priority Data

Jan. 17, 2023 (IT) ........................ 102023000000606

(51) Int. Cl.
*B60J 7/12* (2006.01)
*B60J 7/20* (2006.01)

(52) U.S. Cl.
CPC ............. *B60J 7/1278* (2013.01); *B60J 7/202* (2013.01)

(58) Field of Classification Search
CPC ...... B60J 7/1278; B60J 7/1265; B60J 7/1282; B60J 7/1204; B60J 7/126; B60J 7/1226; B60J 7/202; B60J 7/028
USPC .... 296/107.01, 107.08, 107.09, 107.14, 108, 296/116, 117
See application file for complete search history.

(56) References Cited

U.S. PATENT DOCUMENTS 4,695,089 A * 9/1987 Fukutomi ............... B60R 21/13 296/107.17
5,106,145 A * 4/1992 Corder ................... B60J 7/0076 296/108
5,620,226 A 4/1997 Sautter
6,139,087 A * 10/2000 Wolfmaier ............. B60J 7/1265 296/107.05
7,287,801 B2 * 10/2007 Harrison, III .......... B60J 7/1265 296/121
2005/0062311 A1 * 3/2005 Obendiek ................ B60J 7/146 296/107.18
2006/0131919 A1 * 6/2006 Brockhoff .............. B60J 7/1692 296/107.01

(Continued)

FOREIGN PATENT DOCUMENTS

DE 287068 C * 6/1913
DE 10317416 A1 * 11/2004 ........... B60J 7/0076

(Continued)

OTHER PUBLICATIONS

Applic Ind Soc Et (FR 1382296 A), EPO translation (Year: 2026).*

(Continued)

*Primary Examiner* — Wenwei Zhuo
(74) *Attorney, Agent, or Firm* — Leason Ellis LLP

(57) ABSTRACT

An openable roof for sports cars has a containing tank and a fabric cover movable between an opening position of the roof and a closing position of the roof due to the thrust of two lever mechanisms, which are parallel to one another and are movable relative to one another in a moving direction transverse to a driving direction of the sports car between a narrow position, in which the lever mechanisms are arranged inside the containing tank following the movement of the fabric cover to its opening position, and a wide position, in which the two lever mechanisms extend on the outside of the containing tank following the movement of the fabric cover to its closing position.

11 Claims, 9 Drawing Sheets

(56) References Cited

U.S. PATENT DOCUMENTS

| | | | | |
|---|---|---|---|---|
| 2007/0080558 | A1 * | 4/2007 | Heselhaus | B60J 7/026<br>296/107.08 |
| 2007/0194594 | A1 * | 8/2007 | Heselhaus | B60J 7/1265<br>296/107.01 |
| 2008/0143138 | A1 * | 6/2008 | Spickermann | B60J 7/0076<br>296/107.18 |

FOREIGN PATENT DOCUMENTS

| | | | | | |
|---|---|---|---|---|---|
| FR | 473167 | A | * | 1/1915 | |
| FR | 1382296 | A | * | 12/1964 | B60J 7/1265 |

OTHER PUBLICATIONS

Viertel (DE 287068 C), EPO translation (Year: 2026).*

Italian Search Report and Written Opinion in IT Application No. 202300000606, mailed Aug. 2, 2023 (6 pages) an English translation attached hereto.

* cited by examiner

OPENABLE ROOF FOR SPORTS CARS

CROSS-REFERENCE TO RELATED APPLICATIONS

This patent application claims priority from Italian patent application no. 102023000000606 filed on Jan. 17, 2023, the entire disclosure of which is incorporated herein by reference.

TECHNICAL FIELD

The invention relates to an openable roof for sports cars.

BACKGROUND

In particular, the invention relates to an openable roof for sports cars of the kind comprising a containing tank obtained at the back of a passenger compartment of a sports car; a fabric cover to cover the passenger compartment; and an operating unit to move the fabric cover between an opening position, in which the fabric cover is housed inside the containing tank in order to open the roof, and a closing position, in which the fabric cover extends on the outside of the containing tank in order to close the roof.

The operating unit comprises two lever mechanisms, which are parallel to one another and to a driving direction of the sports car, and a front bar, which extends between the two lever mechanisms and is configured to be coupled to a support ring of a front windshield of the sports car following the movement of the fabric cover to its closing position.

The operating unit further comprises at least one stiffening cross member, which extends between the two lever mechanisms and has a constant length.

The fabric cover is fixed to the front bar and to the two lever mechanisms so as to be moved between a spread configuration on the outside of the containing tank, when the roof is closed, and a folded configuration inside the containing tank, when the roof is open.

Since the distance between the two lever mechanisms in the closing position substantially is the same as the distance between the two lever mechanisms in the opening position, known openable roofs for sports cars of the kind described above suffer from some drawbacks, which are mainly due to the fact that the containing tank needs to have, in plan view, a substantially rectangular shape and that, as a consequence, said openable roofs are not suited to be installed in sports cars with a shape that is tapered towards the back.

SUMMARY

The object of the present invention is to provide an openable roof for sports cars which is not affected by the aforementioned drawbacks and can be manufactured in a simple and economic fashion.

According to the present invention, there is provided an openable roof for sports cars as claimed in the appended claims.

BRIEF DESCRIPTION OF THE DRAWINGS

The invention will now be described with reference to the accompanying drawings showing a non-limiting embodiment thereof, wherein.

DESCRIPTION OF EMBODIMENTS

Figure 1:
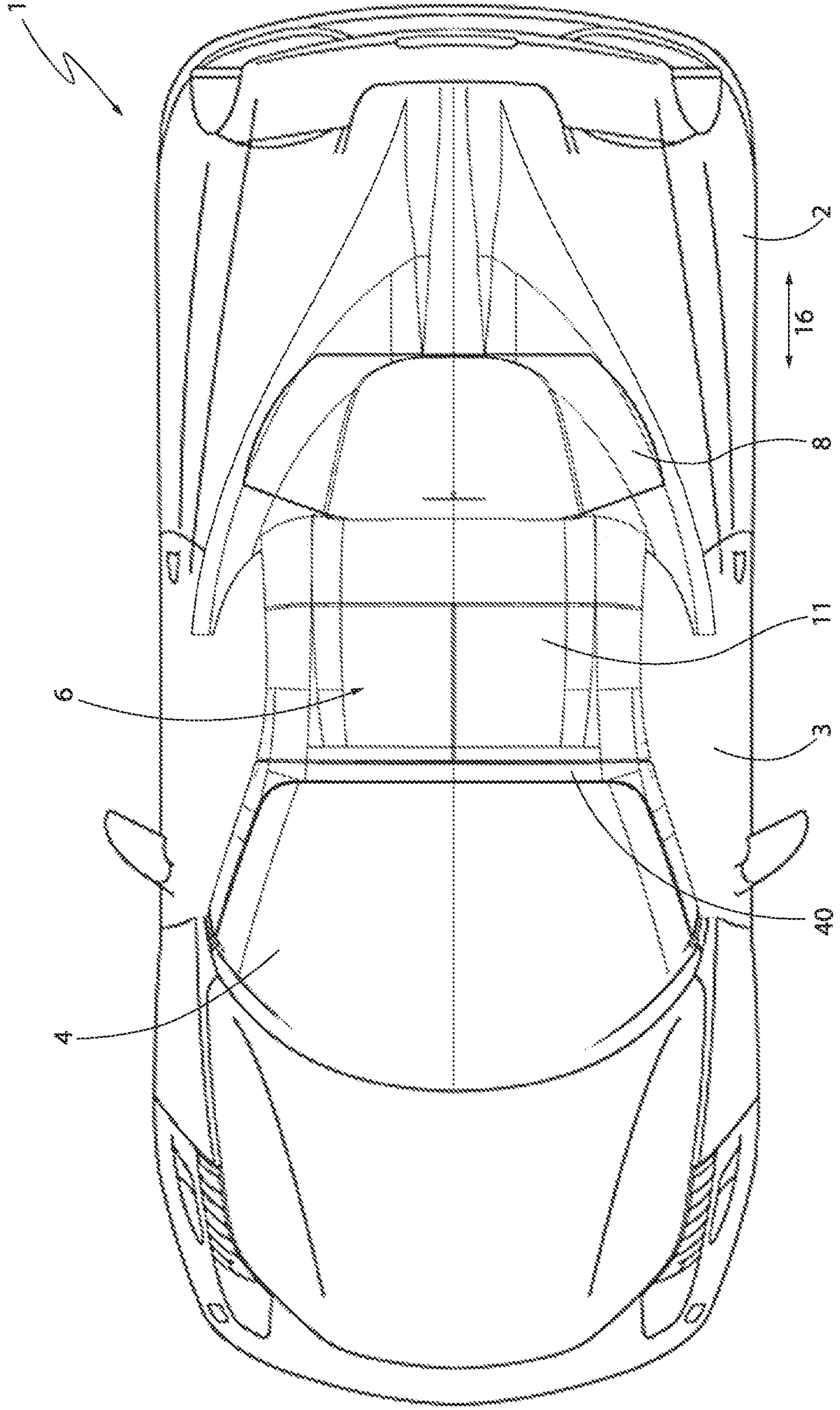
FIG. 1 is a schematic plan view, with parts removed for greater clarity, of a sports car provided with a preferred embodiment of the openable roof according to the present invention.

With reference to FIG. 1, number 1 indicates, as a whole, a sports car comprising an outer body 2 having a shape that is tapered towards the back of the car 1 and a passenger compartment 3 projecting upwards from a lower floor of the car 1 in order to accommodate, on the inside, at least the driver of the car 1.

Figure 4:
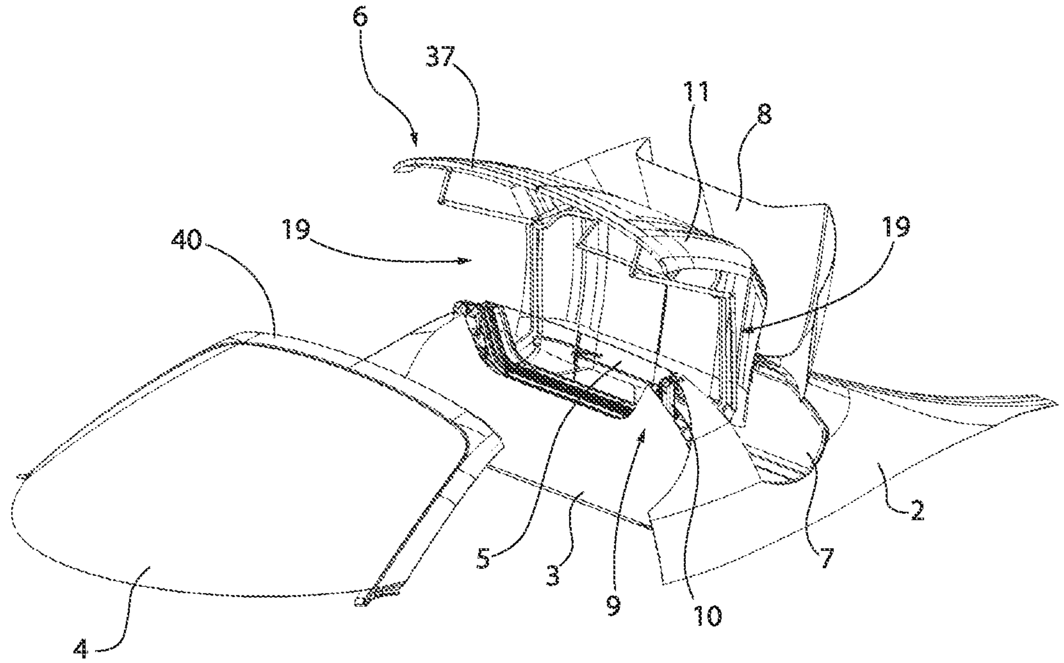
Figure 5:
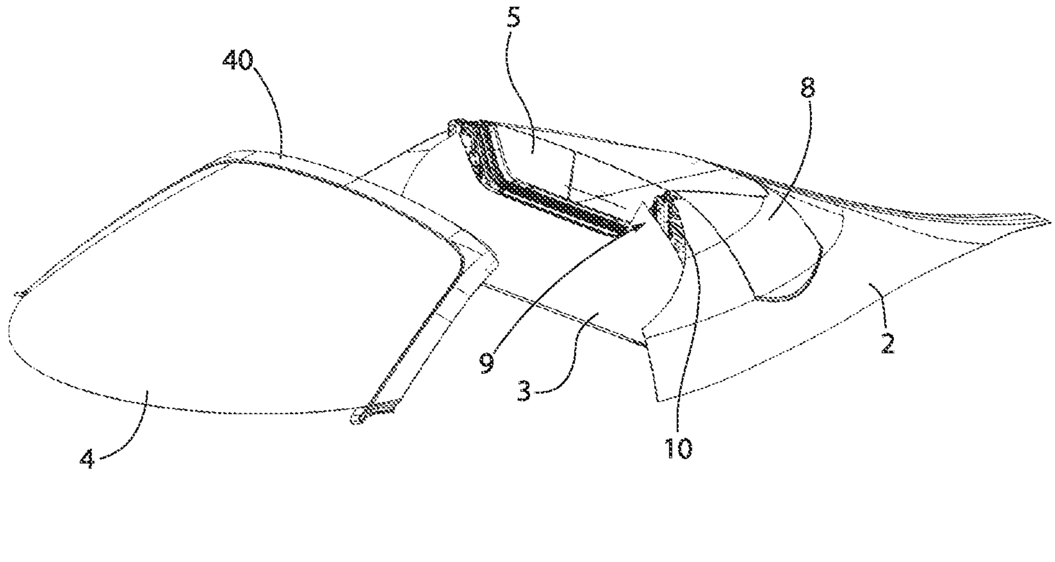
Figure 6:
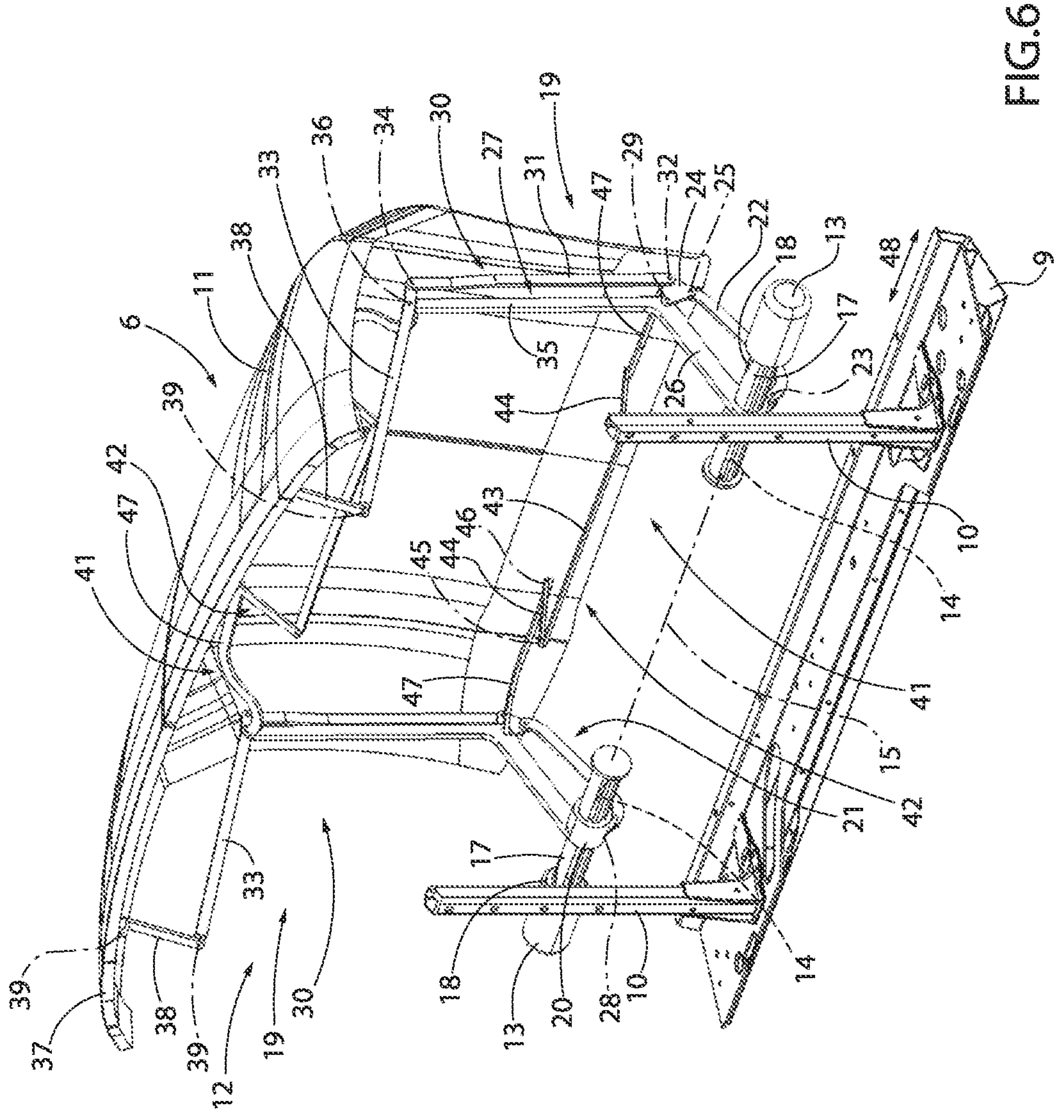
FIGS. 6, 7 and 8 are three schematic perspective views, with parts removed for greater clarity, of a detail of FIGS. 2, 3, 4 and 5 shown in three different operating positions.
Figure 7:
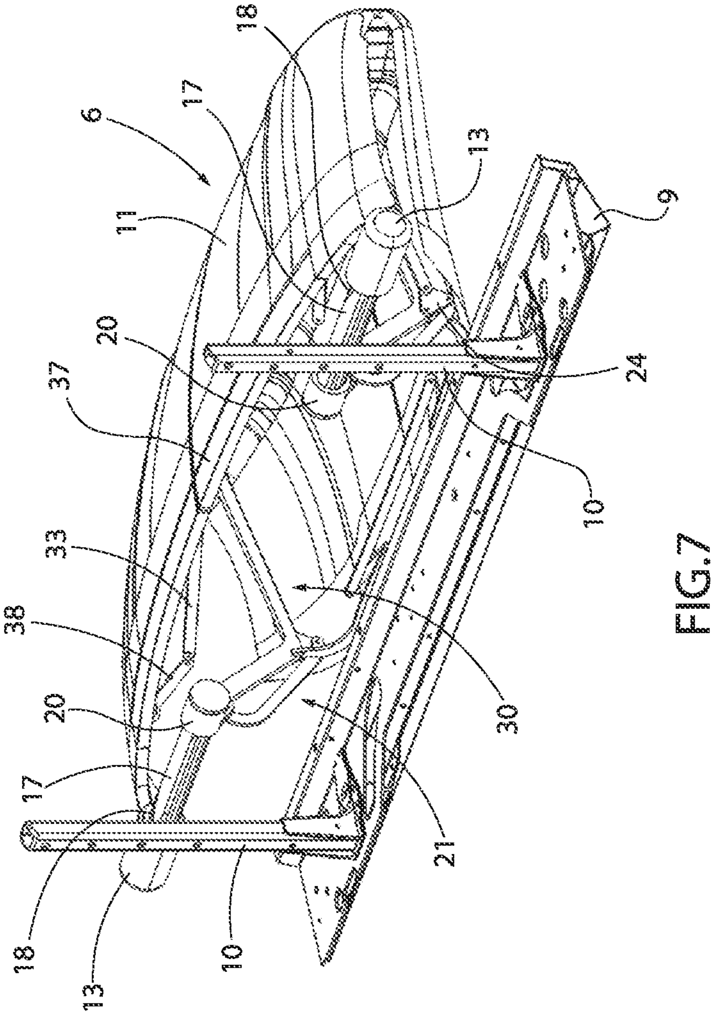
Figure 8:
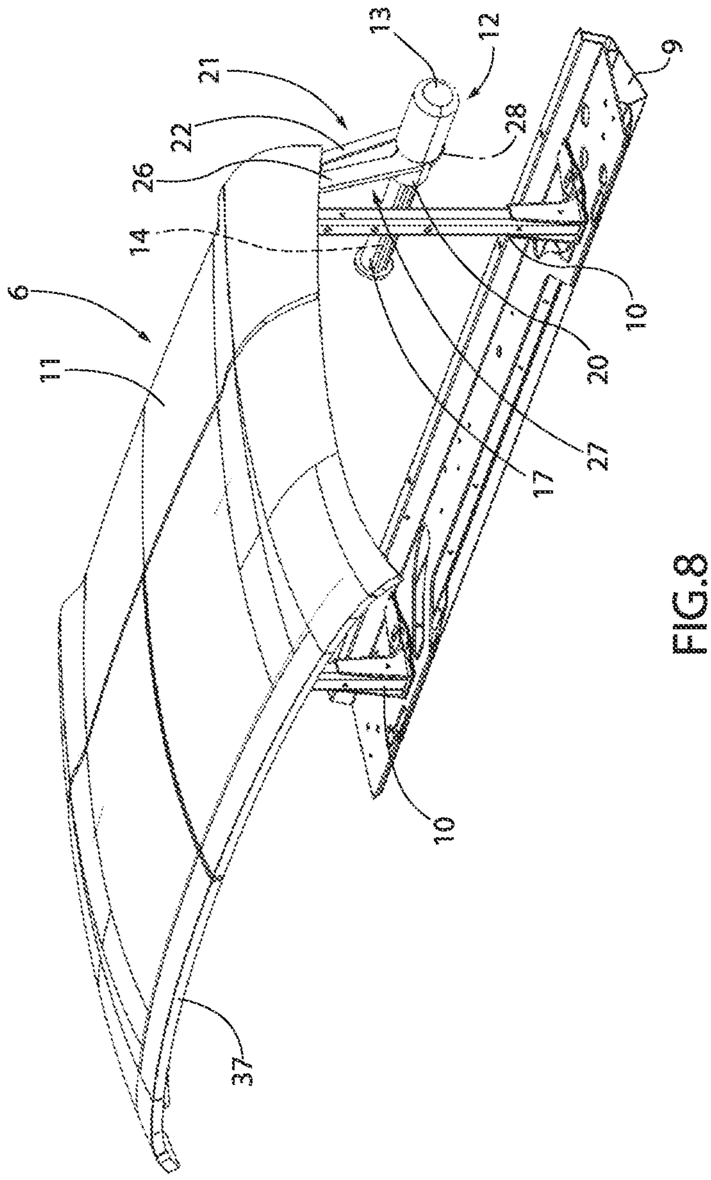
Figure 9:
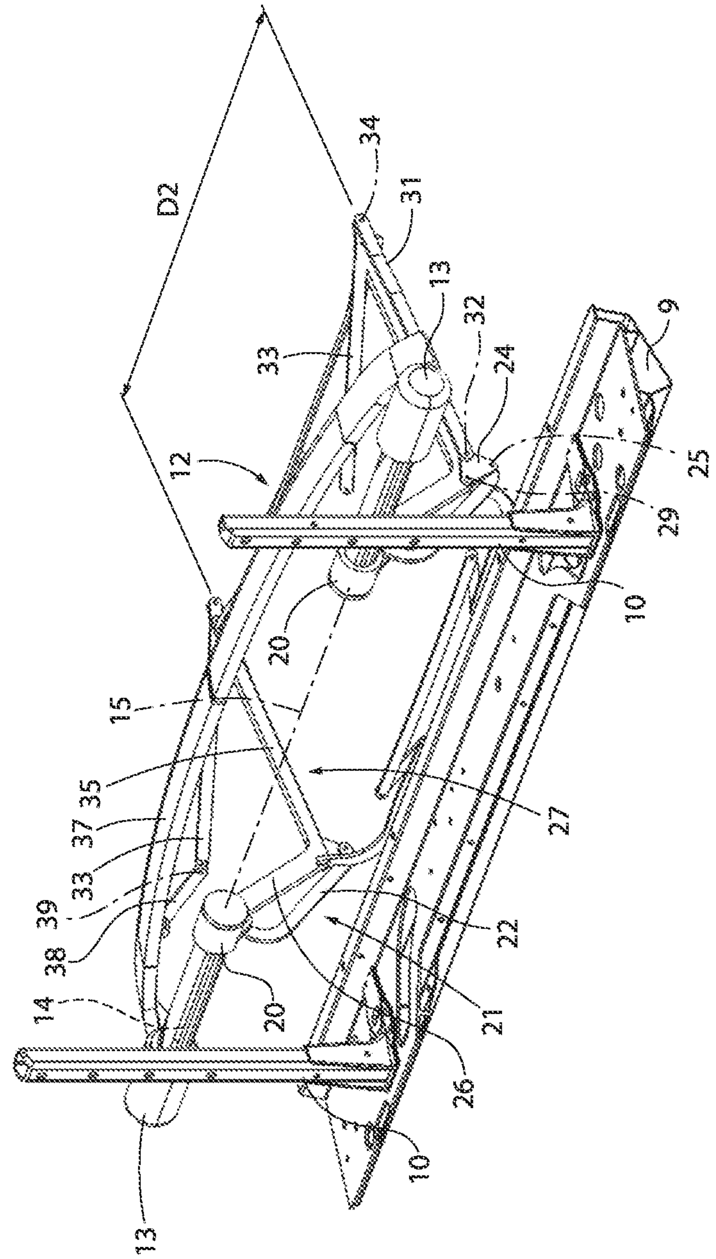
FIGS. 9, 10 and 11 are three schematic perspective views, with parts removed for greater clarity, of a detail of FIGS. 6, 7 and 8 shown in three different operating positions.
Figure 10:
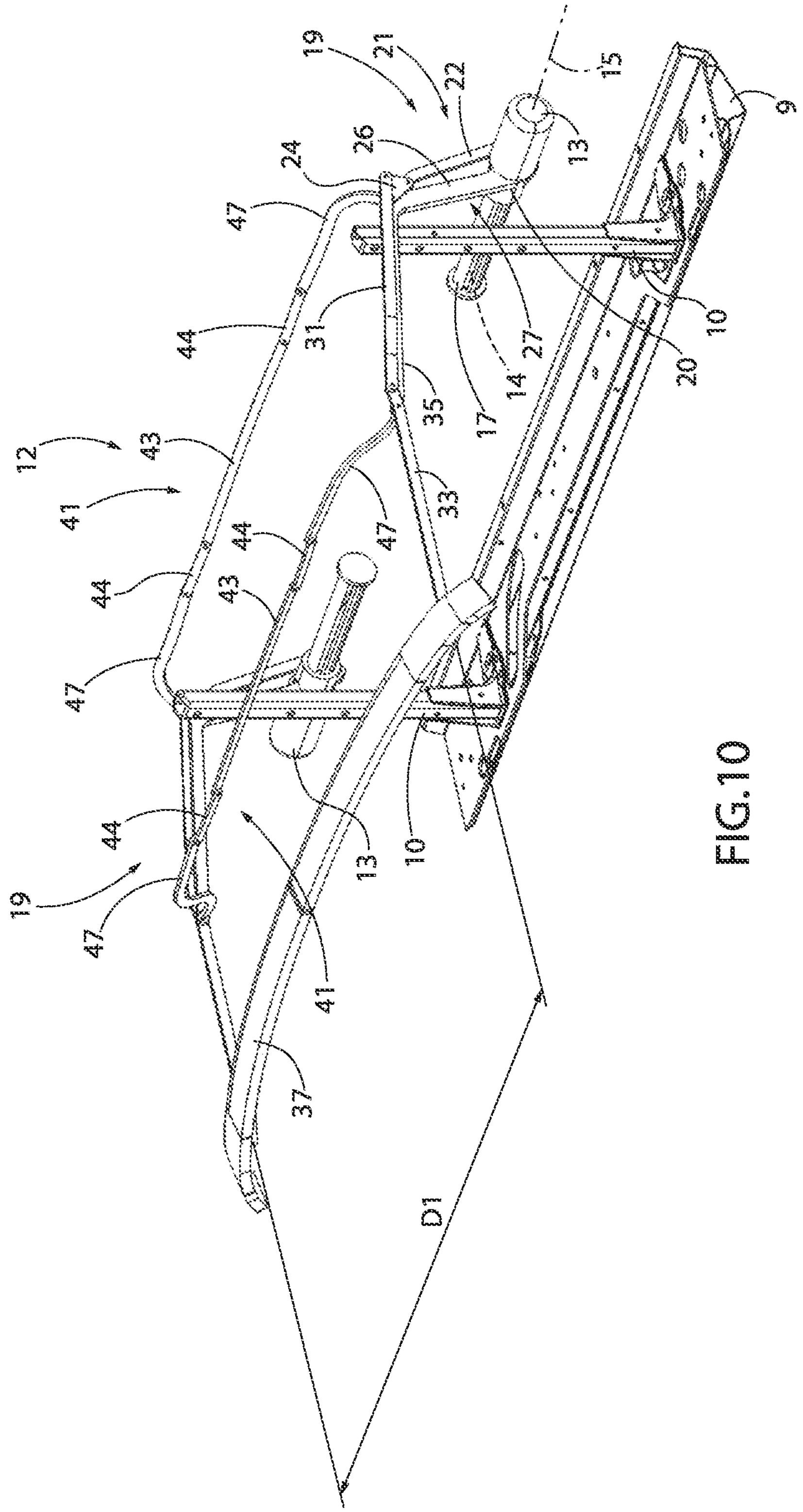
Figure 11:
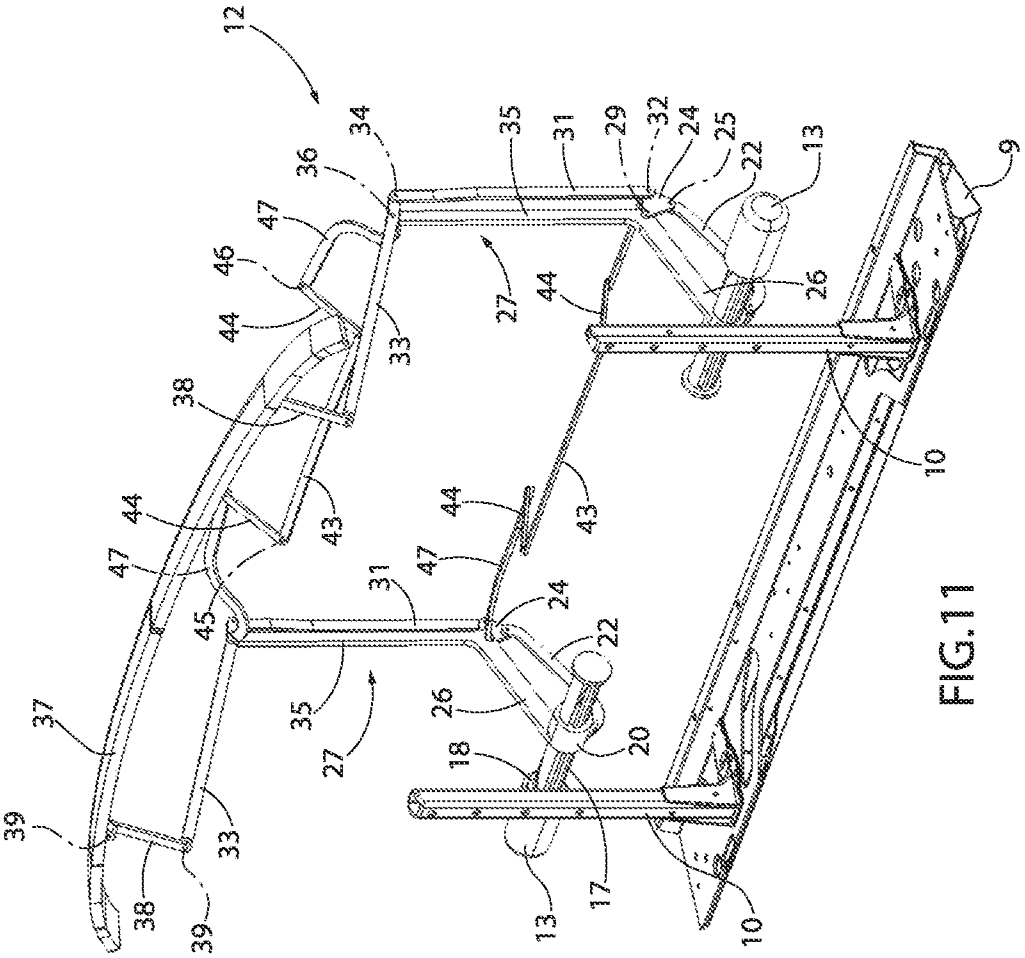

The passenger compartment 3 is closed by a front windshield 4, by a rear windshield 5 (FIGS. 4 and 5) and by an openable roof 6.

The roof 6 comprises a containing tank 7, which is obtained at the back of the passenger compartment 3 and has, in plan view, the shape of a trapezium arranged with its larger base between the passenger compartment 3 and a smaller base of its.

Figure 2:
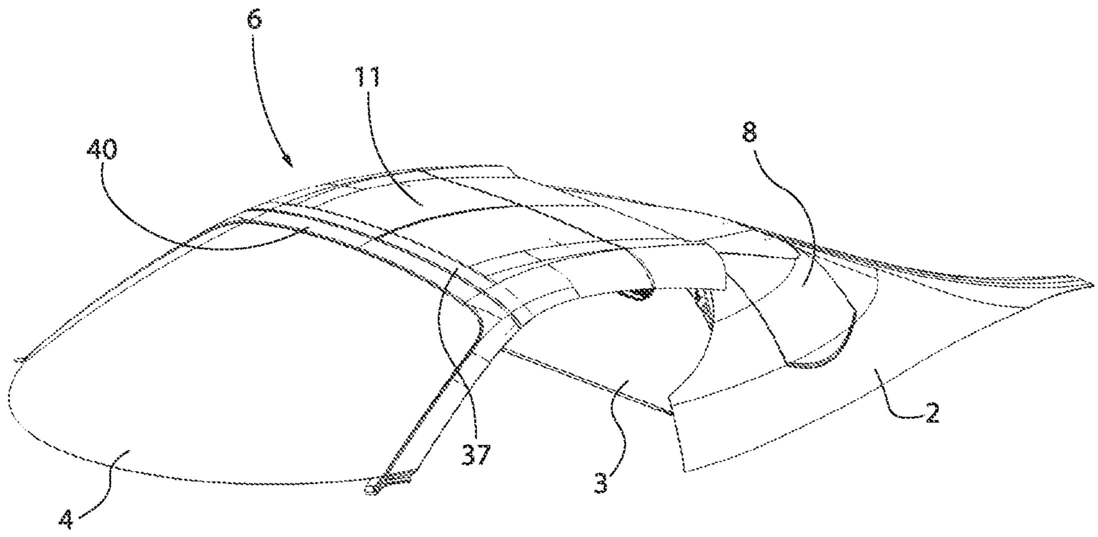
FIGS. 2, 3, 4 and 5 are four schematic perspective views, with parts removed for greater clarity, of a detail of the sports car of FIG. 1 shown in four different operating positions.
Figure 3:
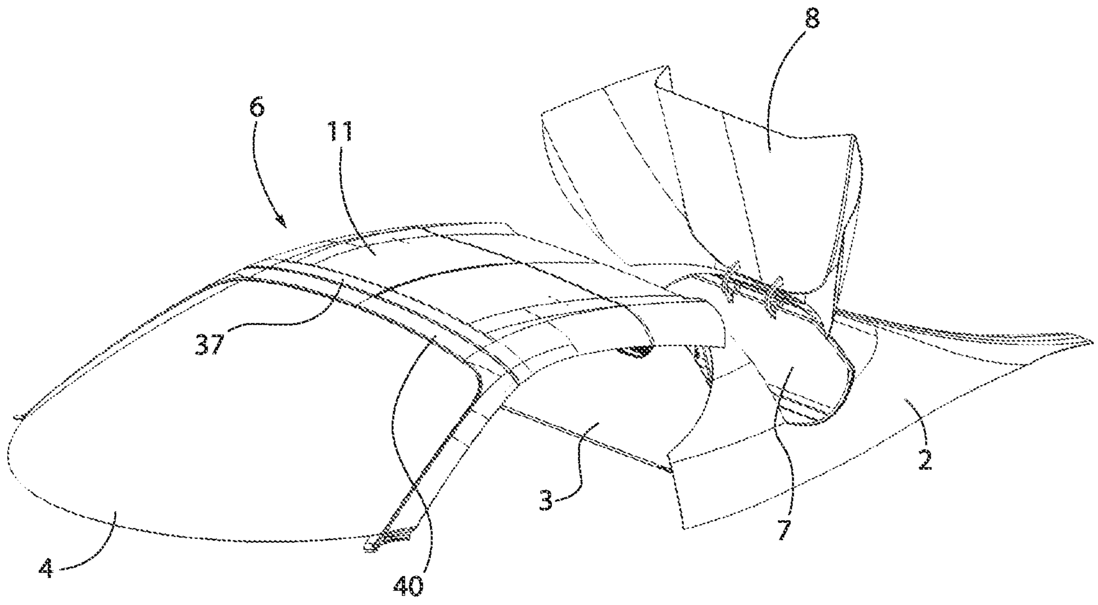

The tank 7 is closed by a lid 8 coupled to the body 2 in a rotary manner so as to move between a closing position (FIGS. 2 and 5) and an opening position (FIGS. 3 and 4) closing and opening the tank 7.

The roof 6 further has a support frame 9, which is integrated in the body 2 and is provided with two vertical uprights 10 parallel to one another and projecting into the tank 7.

According to FIGS. 2 to 11, the roof 6 further comprises a fabric cover 11 to close the passenger compartment 3 at the top and an operating unit 12 to move the cover 11 between an opening position, in which the cover 11 is arranged inside the tank 7 in order to open the roof 6, and a closing position, in which the cover 11 is arranged on the outside of the tank 7 in order to close the roof 6.

The operating unit 12 comprises two electric motors 13, which are aligned with and face one another and have respective output shafts 14 mounted so as to rotate around a common rotation axis 15, which is substantially transverse to a driving direction 16 of the car 1.

Each motor 13 is fixed to a sleeve 17, which is coaxial to the axis 15, extends around the relative shaft 14 and is fixed, in turn, to a relative upright 10.

Each sleeve 17 has a helical guide 18, which is obtained through the sleeve 17 and is wound like a spiral around and along said axis 15.

The unit 12 further comprises two lever mechanisms 19 parallel to one another, each associated with a relative motor 13 and comprising a collar 20, which is fitted on the relative sleeve 17 coaxial to the axis 15 and is coupled to the relative shaft 14 by means of a screw-nut screw coupling, in particular by means of a recirculating ball coupling, and is further coupled to the guide 18 of the sleeve 17 so as to move, with a rotation-translation movement, along and around the aforesaid axis 15.

The collar 20 defines the first member of a first articulated quadrilateral 21 further comprising a second member 22 with an elongated shape coupled in a rotary manner, on one side, to the collar 20 so as to rotate, relative to the collar 20, around a rotation axis 23 parallel to the axis 15 and, on the other side, to a third member 24 of the first articulated quadrilateral 21 so as to rotate, relative to the member 24, around a rotation axis 25 parallel to the axis 15.

The articulated quadrilateral 21 further comprises a fourth member 26, which is defined by a first arm of a rocker arm 27 and extends between two rotation axes 28, 29 parallel to one another and to the axis 15, the axis 28 being the rotation axis between the collar 20 and the member 26 and the axis 29 being the rotation axis between the rocker arm 27 and the member 24.

The member 24 defines the first member of a second articulated quadrilateral 30 comprising, in addition, a second member 31 with an elongated shape coupled in a rotary manner, on one side, to the member 24 so as to rotate, relative to the member 24, around a rotation axis 32 parallel to the axis 15 and, on the other side, to a third member 33 of the second articulated quadrilateral 30 so as to rotate, relative to the member 33, around a rotation axis 34 parallel to the axis 15.

The second articulated quadrilateral 30 further comprises a fourth member 35, which is defined by a second arm of the rocker arm 27 and extends between the axis 29 and a rotation axis 36 of the member 35 relative to the member 33.

The members 33 of the two lever mechanisms 19 have an elongated shape, project from the second articulated quadrilateral 30 and have respective free ends connected to a front bar 37 of the operating unit 12.

Each member 33 is connected to the bar 37 through the interposition of a connecting rod 38, which extends between two rotation axes 39 transverse to the axis 15, one of them being the rotation axis of the connecting rod 38 relative to the member 33 and the other one being the rotation axis of the connecting rod 38 relative to the bar 37.

The bar 37 is configured to be coupled to a support ring 40 of the front windshield 4 following the movement of the cover 11 to its closing position.

The operating unit 12 further comprises, in this specific case, two stiffening cross members 41 with a variable length to connect the two lever mechanisms 19 to one another.

Each cross member 41 comprises, in this specific case, a crank mechanism 42 comprising, in turn, a central connecting rod 43 and two side cranks 44, each extending between two rotation axes 45, 46 parallel to one another and transverse to the axis 15, the axis 45 being the rotation axis of the crank 44 relative to the connecting rod 43 and the axis 46 being the rotation axis of the crank 44 relative to a coupling bracket 47 shaped so as to project from the rocker arm 27 of a relative lever mechanism 19 towards the other lever mechanism 19.

With regard to what disclosed above, it should finally be pointed out that the cover 11 is coupled to the front bar 37 and to the lever mechanisms 19.

In use, the activation of the electric motors 13 leads to the rotation of the relative output shafts 14 and, hence, to the rotation-translation movement of the collars 20 along and around said axis 15.

The combination of the movement of the collars 20 in a moving direction 48 parallel to the axis 15 with the movement of the collars 20 around the axis 15 leads to the movement of the lever mechanisms 19 between a wide position (FIGS. 8 and 10), in which the lever mechanisms 19 are arranged on the outside of the containing tank 7 and at a distance D1 from one another measured parallel to the direction 48, and a narrow position (FIGS. 7 and 9), in which the lever mechanisms 19 are arranged inside the containing tank 7 and at a distance D2 from one another, also measured parallel to the direction 48, that is smaller than both the distance D1 and the minimum width of the tank 7.

As a consequence, the lever mechanisms 19 and the cover 11 are movable between the opening position of the roof 6 (FIG. 7), in which the lever mechanisms 19 get closer to one another in the direction 48 in order to get into the tank 7 and store the cover 11 in a U-shaped configuration inside the tank 7, and the closing position of the roof 6 (FIG. 8), in which the lever mechanisms 19 move away from one another in the direction 48 in order to place themselves on the outside of the tank 7 and move the cover 11 to a spread configuration on the outside of the tank 7.

According to a variant which is not shown herein, the crank mechanisms 42 are eliminated and replaced by respective telescopic bars.

The invention claimed is:

1. An openable roof for sports cars, the roof comprising a containing tank; a fabric cover; and an operating unit to move the fabric cover between an opening position, in which the fabric cover is housed inside the containing tank in order to open the roof, and a closing position, in which the fabric cover extends on the outside of the containing tank in order to close the roof; the operating unit comprising two lever mechanisms, which are parallel to one another and to a driving direction of the sports car, and a front bar, which extends between the two lever mechanisms and is configured to be coupled to a support ring of a front windshield of the sports car following the movement of the fabric cover to its closing position; the fabric cover being fixed to the front bar and to the two lever mechanisms; and being characterized in that the two lever mechanisms are movable relative to one another in a moving direction, which is transverse to the driving direction of the sports car, between a narrow position, in which the lever mechanisms are arranged inside the containing tank following the movement of the fabric cover to its opening position, and a wide position, in which the lever mechanisms extend on the outside of the containing tank following the movement of the fabric cover to its closing position;

wherein the operating unit comprises, for each lever mechanism, a respective actuator device to move the lever mechanism in the moving direction between its narrow and wide positions;

wherein each lever mechanism (19) comprises a first articulated quadrilateral (21) connected to the relative actuator device (13) and a second articulated quadrilateral (30) interposed between the first articulated quadrilateral (21) and the front bar (37);

wherein the first articulated quadrilateral is kinematically connected to the actuator device to directly receive motion therefrom, and the second articulated quadrilateral is driven by the first articulated quadrilateral.

2. An openable roof for sports cars, the roof comprising a containing tank; a fabric cover; and an operating unit to move the fabric cover between an opening position, in which the fabric cover is housed inside the containing tank in order to open the roof, and a closing position, in which the fabric cover extends on the outside of the containing tank in order to close the roof; the operating unit comprising two lever mechanisms, which are parallel to one another and to a driving direction of the sports car, and a front bar, which extends between the two lever mechanisms and is configured to be coupled to a support ring of a front windshield of the sports car following the movement of the fabric cover to its closing position; the fabric cover being fixed to the front bar and to the two lever mechanisms; and being characterized in that the two lever mechanisms are movable relative to one another in a moving direction, which is transverse to the driving direction of the sports car, between a narrow position, in which the lever mechanisms are arranged inside the containing tank following the movement of the fabric cover to its opening position, and a wide position, in which the lever mechanisms extend on the outside of the containing tank following the movement of the fabric cover to its closing position;

wherein the operating unit comprises, for each lever mechanism, a respective actuator device to move the lever mechanism in the moving direction between its narrow and wide positions;

wherein each lever mechanism comprises a first articulated quadrilateral connected to the relative actuator device and a second articulated quadrilateral interposed between the first articulated quadrilateral and the front bar;

wherein each actuator device comprises an electric motor provided with an output shaft mounted so as to rotate around a rotation axis, which is substantially parallel to the moving direction; the first articulated quadrilateral of each lever mechanism comprising a first member coupled to the output shaft of the relative electric motor so as to move with a rotation-translation motion along and around said rotation axis.

3. The openable roof according to claim 2, wherein the distance (D2) between the lever mechanisms (19) arranged in their narrow position, which is measured parallel to the moving direction (48), is smaller than the distance (D1) between the lever mechanisms (19) arranged in their wide position and than the minimum width of the containing tank (7), which are also measured parallel to the moving direction (48).

4. The openable roof according to claim 2, wherein the operating unit (12) further comprises at least one stiffening cross member (41) with a variable length interposed between the lever mechanisms (19) in order to connect the lever mechanisms (19) to one another.

5. The openable roof according to claim 4, wherein the stiffening cross member (41) comprises a telescopic bar or a crank mechanism (42).

6. The openable roof according to claim 2, wherein the first articulated quadrilateral further comprises a second member and a third member, which are connected to the first member in a rotary manner, and a fourth member, which is connected to said second and third member in a rotary manner.

7. The openable roof according to claim 6, wherein the second articulated quadrilateral comprises a fifth and a sixth member, which are connected to the fourth member in a rotary manner, and a seventh member, which is connected to said fifth and sixth member in a rotary manner and projects from the second articulated quadrilateral; the front bar being connected to the seventh members of the two lever mechanisms.

8. The openable roof according to claim 7, wherein the front bar is coupled to the seventh member of each second articulated quadrilateral through the interposition of a relative connecting rod coupled to the seventh member and to the front bar in a rotary manner.

9. The openable roof according to claim 2, wherein the operating unit further comprises, for each electric motor, a respective helical guide, which extends around the output shaft of the electric motor, is wound like a spiral around and along said rotation axis and is engaged with a rotation-translation motion by the first member of the relative first articulated quadrilateral.

10. The openable roof according to claim 2, wherein the fabric cover has, when the roof is closed, a spread configuration and further has, when the roof is open, a U-folded configuration inside the containing tank.

11. The openable roof according to claim 2, wherein the containing tank has, in plan view, a substantially trapezoid-like shape.

* * * * *